United States Patent [19]

Eminger

[11] 4,053,111

[45] Oct. 11, 1977

[54] APPARATUS AND METHOD FOR PRODUCING DISTRIBUTED STATOR WINDINGS

[75] Inventor: Robert J. Eminger, Fort Wayne, Ind.

[73] Assignee: Windamatic Systems, Inc., Fort Wayne, Ind.

[21] Appl. No.: 747,885

[22] Filed: Dec. 6, 1976

[51] Int. Cl.$^2$ .................. B65H 81/06; H01F 7/06
[52] U.S. Cl. .................... 242/1.1 R; 29/605; 29/736
[58] Field of Search .......... 242/1.1 R; 29/596, 605, 29/736

[56] References Cited

U.S. PATENT DOCUMENTS

| | | | |
|---|---|---|---|
| 2,770,424 | 11/1956 | Grove | 242/1.1 R |
| 3,411,725 | 11/1968 | Biddison | 242/1.1 R |
| 3,750,969 | 8/1973 | Weis | 242/1.1 R |
| 3,995,785 | 12/1976 | Arick | 242/1.1 R |

Primary Examiner—Edward J. McCarthy
Attorney, Agent, or Firm—Woodard, Weikart, Emhardt & Naughton

[57] ABSTRACT

Disclosed is the apparatus and method for depositing a winding of varying depth along the teeth of a stator. The necessity for complex motion of the winding head is avoided by moving the head in conventional reciprocating fashion and then introducing winding turn distributing elements from outboard of the stator. The distributing elements are moved radially inward between the path of the wire-dispensing component of the winding head and the end faces of the stator tooth receiving the winding. The distributing elements are moved in a series of reciprocating strokes of decreasing length as the winding head moves through its winding path, thereby distributing the windings in increasing depth toward the base of the stator tooth receiving the winding.

11 Claims, 3 Drawing Figures

APPARATUS AND METHOD FOR PRODUCING DISTRIBUTED STATOR WINDINGS

BACKGROUND OF THE INVENTION

A considerable technology concerned with high-speed winding of stator cores has developed over the years and my U.S. Pat. Nos. 2,949,789, 3,785,212 and 3,821,903 are illustrative of this development. Various means, shown in these patents, are utilized for moving the winding head and its wire-dispensing member, or needle, in a compound reciprocating high-speed stroke which is sequentially parallel to and then transverse to the axis of the stator bore to thereby place a winding around the stator poles or teeth.

Recent developments in, and broadening of, the application of various types of electrical servo devices (stepper motors are an example) have introduced complications in the winding process for these motors. Many types of specialized motors utilize stator cores of relatively small size with a relatively large number of teeth extending radially inward to define a central stator bore which is small in cross-section. The teeth are straight sided and the slot area between the radial teeth is, therefore, of circular sector configuration. In order to provide a maximum number of turns on each tooth, it is, thus, desirable to place windings on the teeth which are of varying depth—that is, varying from a minimum depth at the free, inner end of each tooth to a maximum at the base of the tooth. The circular sector configuration of the space between teeth is thereby utilized to maximum effectiveness.

The placing of such varying depth windings appears, using conventional stator winding technology, to require the imposing of a further radial movement on the winding head in addition to the sequential angular and vertical reciprocating motion necessary to produce the conventional winding. The additional radial motion imposed must, to make the matter still more complicated, be composed of a series of strokes of decreasing magnitude. Apparatus has been attempted utilizing complicated dwell gearing to provide the required added radial motion to the wire-dispensing member component of the winding head. Other apparatus has attempted to solve the problem by bodily shifting the winding head and its wire-feeding shaft in a sequenced, orbital, circular path; but this mode of operation is inhibited by the relatively small central boe (some of the order of ⅜ inch in diameter) of the stators being wound and the relatively long stator teeth. Both types of apparatus have proved to be prone to malfunctioning and, of necessity, can be operated only at relatively slow winding speeds.

The concept of the present invention provides for placing windings of varying depth on the radial stator teeth at high speed and without imposing an additional motion component on the winding head. This is accomplished by utilizing winding turn distributing elements, or shrouds, inserted from outside the stator circumference (as contrasted with the central bore of the stator). The elements move between the oscillating motion path of the wire-dispensing needle and the opposite end faces of the stator and their motion comprises a series of strokes of decreasing length. The conventional vertical motion of the winding head pulls the wire along the tapered tip of the elements depositing the wire at a location on the stator tooth immediately adjacent the tips of the shrouds. Because of their series of strokes referred to above, the shroud tips move more repeatedly over the base area of the tooth, resulting in the placing of a winding of increasing depth along the tooth with the greater thickness of the winding occurring adjacent the tooth base. This filling of the circular sector configurated space between stator core teeth with the maximum number of winding turns is accomplished without adding any additional motion component to the winding head in the central bore of the stator. Since the winding head need only perform its conventional oscillating angular motion and reciprocating vertical motion, the winding head may extend through and be actuated through the central bore of the stator core even though the bore is of relatively small diameter. Introduction of the wire-distributing elements or shrouds into the winding path from the *exterior*, or out-board of, the core, rather than from within its central bore, permits the depositing of windings of varying thickness in extremely limited available space such as the circular sector shaped space between the inwardly extending teeth or poles of a small stepper motor stator core. The apparatus may be operated at high speed with windings placed on the core teeth at a rate of the order of 1200 turns per minute being typical.

DESCRIPTION OF THE PREFERRED EMBODIMENT

Figure 1:
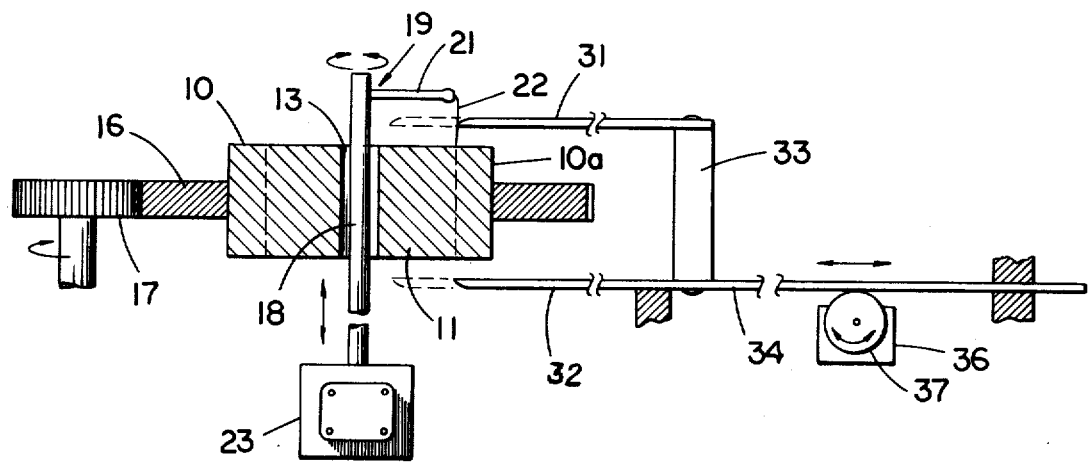
FIG. 1 is a schematic fragmentary view of the apparatus of the present invention in operation during the winding of a stator core.
Figure 2:
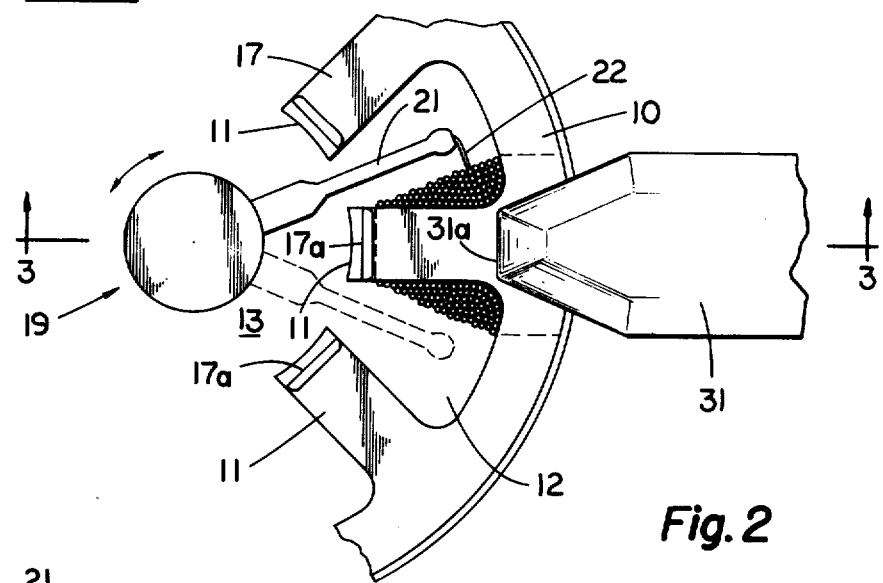
FIG. 2 is a fragmentary, top plan view of a stator core, winding head, wire-distributing elements of the present invention and a winding being disposed on the core during the winding operation.

Referring initially to FIG. 1, there is shown a stator core 10 which, as will be evident from FIG. 2, is of hollow cylindrical configuration having a plurality of radially inwardly extending poles or teeth 11. The slots between the teeth indicated at 12 in FIG. 2 are of circular sector configuration, the free inner ends of the teeth defining a central bore for the stator identified at 13.

As may best be seen in FIG. 1, the stator is locked in a suitable fixture 16 which is adapted for indexing about the central axis of the bore 13 by means of the gear 17 which meshes with the toothed outer margin of the fixture 16. It will be understood that the gear 17 may be actuated at the desired time for a suitable time interval to provide the proper indexing of the stator. Other means for indexing the stator about the axis of the bore as each winding is placed on the proper stator tooth may be devised. The stator may be formed in conventional fashion by stacked steel plates, the resulting laminated structure of the stator serving to minimize eddy currents. The stator, expect for its outer circumferential area 10a, may be covered by an electrically insulating, epoxy resin coating and conventional end caps 17 (FIG. 3) may be provided for each of the end faces of the stator teeth, the end caps having longitudinally extending flanges 17a which, as is conventional, serve to retain the winding on the teeth.

Extending centrally through the bore 13 is a wire carrying, hollow shaft 18 supporting a winding head generally indicated at 19. The winding head includes a wire-dispensing member or needle 21 extending radially outward from the winding head and dispensing the winding wire 22.

The winding head actuating mechanism, schematically indicated at 23, in conventional fashion oscillates the winding head angularly from a position in which the needle 21 assumes its solid line position of FIG. 2 to a position of the needle shown in broken lines in FIG. 2. This angular motion of the needle 21 occurs at the upper extremity and the lower extremity of a conventional vertical reciprocating motion of the shaft 18 and consequently its winding head 19. The oscillating angular motion of the winding head may be accomplished by the mechanism shown in detail in my U.S. Pat. No. 3,785,212, previously mentioned, and the reciprocating vertical stroke of the winding head may be accomplished by the mechanism shown in detail in my U.S. Pat. No. 3,821,903 also referred to above. The winding head is moved by the actuating mechanism 23 in a winding path in which the wire-dispensing tip of the needle 21 follows a generally rectangular path circumscribing the tooth 11 on which the winding is being deposited. This winding motion of the winding head 19 is conventional and may proceed at relatively high speed. The upper (solid) lines and lower (broken) lines ar extremities of vertical travel of the winding head and needle 21 as shown in FIG. 3.

Figure 3:
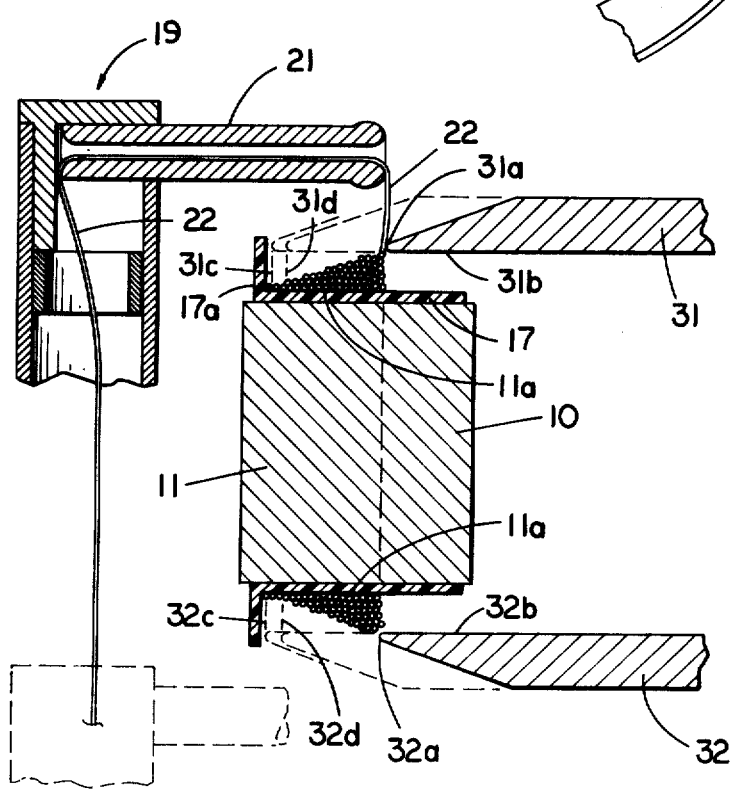
FIG. 3 is a fragmentary, side sectional view taken generally along the line 3—3 of FIG. 2.

With the winding head moving in conventional reciprocating and oscillating fashion as just described, the windings, as will be evident from FIG. 3, will be deposited adjacent the base of the tooth 11. The varying depth of winding along the length of the tooth receiving the winding is accomplished by the action of the wire-distributing elements or shrouds 31 and 32. As will be evident from FIGS. 2 and 3, the free ends of the shrouds 31 and 32 are tapered outwardly from their leading margins 31a and 32a on all of their side surfaces except the surface 31b (and 32b in the case of shroud 32) which are immediately adjacent the stator core end faces. This tapered tip portion of each of the shrouds is, additionally, smooth and highly polished. As may be seen in FIG. 1, the upper and lower members 31 and 32 are rigidly joined by means of a spacer block 33, and extending portion 34 being supported for horizontal, reciprocal motion. A conventional means, such as a stepper motor 36, having a drive member 37 which engages and drives the member 34, may be utilized to provide the required reciprocating stroke of the wire-distributing members 31 and 32. The block 33 may be replaced by a spacer block of differing height where the position of the members 31 and 32 must be adjusted to accommodate stators of various heights. It will be understood that other means might be provided for imparting the required horizontal reciprocating stroke to the member 34.

In operation, with the winding head moving vertically between its solid line and broken line positions (FIG. 3) and with an angular, oscillating motion (between solid and broken line positions in FIG. 2) of the needle transverse to the bore axis at the end of each vertical stroke, wire will be placed on the tooth in the winding path with the initial winding, as will be evident from FIG. 3, being deposited in the general area directly underlying the needle tip and indicated at 11a. As the initial windings are placed, the shrouds 31 and 32 are moved radially inward over the tooth receiving the winding, the initial stroke extending to the broken line position indicated at 31c and 32c in FIG. 3. As the needle moves through its angular horizontal motion, the wire 22 will initially engage the polished, tapered tip portion of the shrouds. As the needle moves through its vertical stroke, the wire will be pulled down the slope of the shroud tip portion and will slip off the tip of the shroud to be deposited on that portion of the tooth directly underlying the shroud tip. The position of the shroud tip thus determines where an individual winding turn will be placed on the tooth. As the shrouds move to their positions 31c and 32c of FIG. 3, turns will be placed along the length of the tooth. During the return movement (rightward, as viewed in FIG. 3), the shrouds deposit an additional winding along the tooth and are then again advanced through a slightly shortened stroke whose extremity is indicated at 31d and 32d in FIG. 3. This places a further series of winding turns of somewhat shorter extent on the tooth.

By moving the shrouds in a series of strokes of decreasing length as the winding head moves through its winding path, it will be evident that a winding of increasing depth, as shown in FIGS. 2 and 3, will be put down. The maximum depth of the winding is only limited by the necessity to maintain space between the windings for the vertical passage of needle 21. After a winding on one tooth is completed, the fixture 16 may be indexed (by gear 17 or any other suitable means) to present whichever tooth is to be wound next depending upon the desired pattern of interpole connection for the stator core.

There need be no complicated coordination of the motion cycle of the winding head with the series of reciprocating strokes of the shrouds. All that is required is that the complete series of decreasing strokes of the shrouds be timed so that they occur in substantially the same total time interval that the winding head utilizes in laying down the desired number of winding turns determined by the design of the stator being wound. Because the winding is uncontrolled between its travel from the shroud tip to the tooth surface, the windings are not completely sequential in position—that is, not level in position but are generally distributed in the increasing depth configuration shown in FIGS. 2 and 3. The windings are deposited at high speed without any imposition of radial motion on the winding head and needle 21. While the method and apparatus have been described in the winding of a stator core for a stepper motor, it will be understood that they might also be utilized in winding other electrical apparatus, exciters for large electric generators, for example.

While there have been described above the principles of this invention in connection with specific apparatus, it is to be clearly understood that this description is made only by way of example and not as a limitation in the scope of the invention.

What is claimed is:

1. A stator winding apparatus for placing a winding of varying depth along the length of radially inwardly extending teeth or pole cores of a stator, the stator having a cylindrical configuration with radial teeth extending inwardly to define a central bore, said apparatus comprising a winding head actuated through said central bore and having a wire-dispensing member moved in a path sequentially parallel to and transverse to the axis of the stator bore and encircling the base of the stator tooth receiving the winding, winding turn distributing elements movably supported outboard of the stator adjacent the end faces thereof, said distributing elements being movable radially inward between said path of the wire-dispensing member and the stator tooth receiving the winding, and means for moving said distributing elements radially inward with respect to the stator in a series of reciprocating strokes of decreasing length as said head moves through its winding path to thereby distribute the windings in increasing depth toward the base of the tooth receiving the winding.

2. A stator winding apparatus as claimed in claim 1 in which said turn distributing elements are tapered outwardly from their leading margins on all their side surfaces except the surface immediately adjacent the stator end faces.

3. A stator winding apparatus as claimed in claim 1 in which said tapered portion of each of said distributing elements has a smoothly polished glossy surface.

4. A stator winding apparatus as claimed in claim 1 in which there are two turn distributing elements, one adjacent each end face of the stator, said elements being moved in unison through their strokes in aligned parallel paths.

5. A stator winding apparatus as claimed in claim 4 in which the space between said parallel paths of the distributing elements is selectively variable to accommodate stators of various axial length.

6. A stator winding apparatus as claimed in claim 1 in which means are provided for indexing the stator around the axis of said central bore to present each stator tooth, in turn, to said wire-dispensing member and distributing elements.

7. A stator winding apparatus as claimed in claim 1 in which the initial inward stroke of such distributing elements is substantially equal in length to the length of said stator teeth.

8. A core winding apparatus for placing a winding of varying depth along the length of radially inwardly extending teeth of a cylindrical core, the core having a hollow cylindrical configuration with radial teeth extending inwardly to define a central bore, said apparatus comprising a winding head actuated through said central bore and having a wire-dispensing member moved in a path sequentially parallel to and transverse to the axis of the central bore and encircling the base of the core tooth receiving the winding, winding turn distributing elements movably supported outboard of the core and adjacent the end faces thereof, said distributing elements being movable radially inward between said path of the wire-dispensing member and the core tooth receiving the winding, and means for moving said distributing elements radially inward with respect to the core in a series of reciprocating strokes of decreasing length as said head moves through its winding path to thereby distribute the windings in increasing depth toward the base of the tooth receiving the winding.

9. The method of depositing windings of varying depth on a core which is cylindrical in configuration and has a plurality of teeth extending radially inward from the circumferential portion of the core to a central axial bore, said method comprising: providing a wire-dispensing member which extends through the central bore and radially parallel to the core teeth, moving said member in a reciprocating linear and angular winding path adjacent the base of a tooth of the core to deposit a multiple-turn winding transversely around the tooth of the core, providing elongated winding-turn distributing elements which are movably supported outboard of the core and extend radially inward between the core end faces and the path of motion of said wire-dispensing member, and, as said member is moving in its winding path, moving said distributing elements radially inward in a series of reciprocating strokes of decreasing length to distribute the windings in increasing depth toward the base of the tooth.

10. The method of claim 9 but providing the additional step of indexing said core around its central axis to subsequently present the other core teeth to said winding member and distributing elements after completion of the winding on the initial tooth.

11. The method of claim 9 in which the initial inward stroke of said distributing elements is substantially equal in length to the length of said tooth.

* * * * *